Dec. 5, 1933. I. P. WHITEHOUSE Re. 19,016

MOUNTING

Original Filed March 27, 1929

Irving P. Whitehouse
INVENTOR.

BY H. R. Lord
ATTORNEYS.

Reissued Dec. 5, 1933

Re. 19,016

UNITED STATES PATENT OFFICE 19,016

MOUNTING

Irving P. Whitehouse, Erie, Pa., assignor to Hugh C. Lord, Erie, Pa.

Original No. 1,905,540, dated April 25, 1933, Serial No. 350,346, March 27, 1929. Application for reissue September 9, 1933. Serial No. 688,863

26 Claims. (Cl. 248—14.2)

This invention is particularly designed to absorb vibration. In many environments it is desirable to so form the mounting that it will resist extended movement much beyond a small vibration range. Such a mounting is shown in application, Serial Number 220,156, filed by Hugh C. Lord, Sept. 17th, 1927. With the present invention a construction is shown in which this action may be more abruptly controlled than in the illustration of said application. Features and details of the invention will appear from the specification and claims.

A preferred embodiment of the invention is illustrated in the accompanying drawing as follows:—

Figure 1:
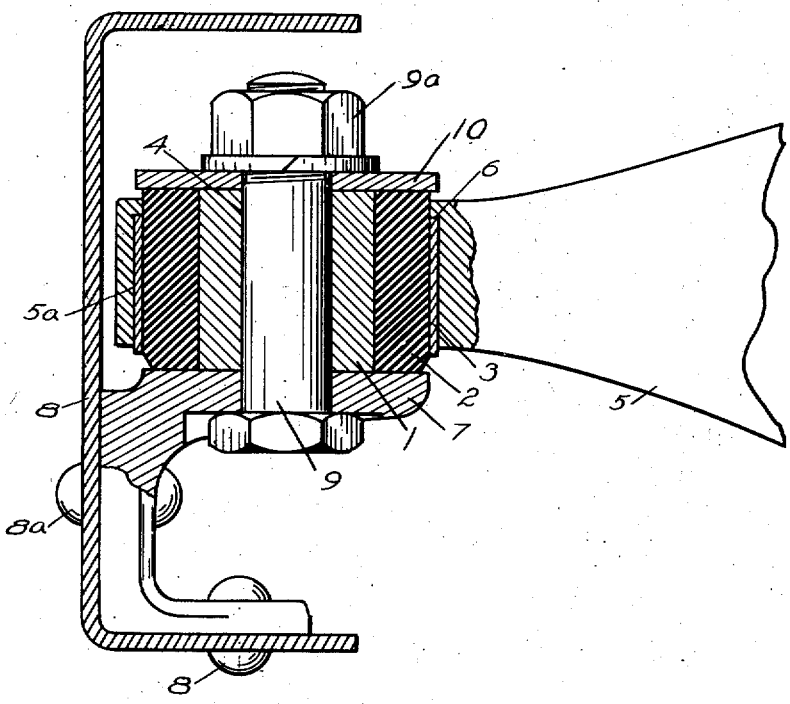

Fig. 1 shows a sectional view of the mounting in place, as shown, being in place as an engine mounting for an automobile.

Figure 2:
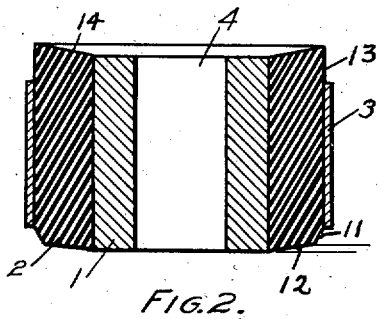

Fig. 2 a central section of the mounting detached and free from load.

Figure 3:
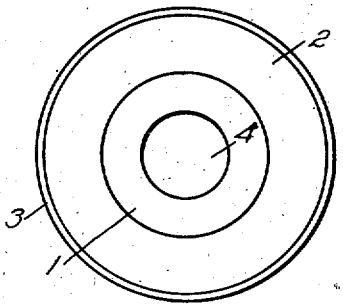

Fig. 3 an end view of the mounting.

1 marks the central member of the mounting which is in the form of a hollow pin, 2 a rubber wall surrounding the central member, and 3 the outer shell. The rubber wall is preferably bonded during vulcanization to the central member and to the outer shell and where this vulcanization is accomplished by heat the cooling of the rubber puts this rubber under initial tension so that while it is very sensitive to vibration it is quite resistant to any extended movement. The central pin has an opening 4 through it by means of which it may be readily secured.

The shell of the mounting is ordinarily secured by a press fit in a socket 5*a*, the socket being in one of the supporting arms 5 of an automobile engine. The socket terminates near the upper surface of the arm forming a shoulder 6 against which the shell 3 seats.

A bracket 7 is secured to an automobile channel frame 8 by rivets 8*a* and forms a base 7*a* on which the rubber seats. A securing bolt 9 extends through the opening 4 and through a plate 10 which extends over the top of the rubber, the bolt 9 being supplied with a nut 9*a* by means of which the plate is clamped on the upper end of the central member.

The rubber projects beyond the outer shell as at 11 and also bulges at 12 from the edge toward the center member giving to the end a convex tapered formation. The rubber projects at 13 from the shell 3, the projection being sufficient to extend through the shoulder 6 and still project to some extent above the top surface of the arm 5 and seats against the underside of the plate 10. The upper surface 14 of the rubber is depressed toward the center member giving to the upper surface a concave tapered formation and this depression is more pronounced than the bulge 12. The marginal lines indicating the taper of the surfaces 12 and 14 are not quite parallel, the lines representing this being closer together at the center than at the outer edge (see Fig. 2).

In other words, the rubber at the outer edge is somewhat thicker than at the center. With the bulging end 15 on the bottom, as shown in Figs. 1 and 2, and the weight placed upon the shell 3, the weight of the motor, or other vibrating instrument depresses the shell 3 to a point that brings the surface 12 just into contact with the surface 7. At the same time this movement of the shell tends to straighten the upper surface of the rubber. If the two surfaces 12 and 14 are parallel and the weight is adjusted to just the load-carrying capacity of the rubber between the shell and pin the two surfaces 12 and 14 would contact the plates 7 and 10 without pressure. The rubber at the edges is entirely in neutral and does not begin to add its resistance to the resistance of the rubber spanning the space between the shell and pin in some instances with sufficient abruptness. It is desirable, therefore, to make the rubber slightly longer at the outer edge than at the center and so adjust it that there is a slight initial compression at the outer edge of the upper surface 14 and just contacts on the lower surface 12. As a result with the center pin mounted on a lower seat and the plate 10 drawn down against the upper surface 14 the outer shell and with it the outer edge of the surface 12 will move downwardly subject to this depressing effect of the plate 10 and the normal load. Thus at least the outer edges of the upper surface 14 are under very slight initial compression and the outer edges of the surface 12 are preferably in contact with the seat 7 and under very slight initial compression. By this means the rubber is compressed at the edges of the surfaces 12 and 14 so as to eliminate some of the initial practically non-resistant quality of the rubber under initial compression, so that with any further movement the resistance may go up very abruptly. Under these conditions, all the rubber is sensitive to incipient vibrations which are peculiar to vibrating members, such as motors, but the rubber is just on the edge of a very abrupt building up of resistance due to the fact of the greater thickness at the edge. It will be understood that under some conditions the upward pressure at the edge of the surface 14 may be greater than the downward pressure of the edge of the surface 12 on the seat 7. This may be accomplished by increasing the bevel of the surface 14 from that of the bevel 12 and with relation to the normal load. It will be noted, therefore, that the downward pressure of the plate 10 on the outer edge of the surface 14 is an added part of the load on the mounting as a whole.

What I claim as new is:—

1. In a mounting, the combination of a supported and a supporting member having opposing spaced walls; and a dampening member comprising an uncompressed rubber portion between the walls and normally carrying a major portion of the load of the supported member on the supporting member through shear of the rubber and a rubber portion having initial engagement with one of the members and subjected to compression through said engagement and incident to shock on the supported member.

2. In a mounting, the combination of a supported and a supporting member having spaced walls; and a dampening member comprising a rubber portion under initial tension between the walls and normally carrying a major portion of the load of the supported member on the supporting member through shear of the rubber and a rubber portion having initial engagement with one of the members and subjected to compression through said engagement and incident to shock on the supported member.

3. In a mounting, the combination of a supported and a supporting member having spaced walls; and a dampening member comprising an uncompressed rubber portion between the walls and normally carrying a major portion of the load of the supported member on the supporting member through shear of the rubber and rubber portions having initial engagement with one of the members subjected to compression through said engagement with a movement of the supported member in both load and rebound directions through shock on the supported member.

4. In a mounting, the combination of a supported member and a supporting member, one of said members being within the other and said members having spaced walls; and a dampening member comprising an uncompressed rubber portion between the walls and normally carrying a major portion of the load of the supported member on the supporting member through shear of the rubber and a rubber portion having initial engagement with one of the members subjected to compression initially through said engagement and to further compression through shock on the supported member.

5. In a mounting, the combination of a supported member and a supporting member, one of said members being within the other and said members having spaced walls; and a dampening member comprising a rubber portion under initial tension between the walls and normally carrying a major portion of the load of the supported member on the supporting member through shear of the rubber and a rubber portion having initial engagement with one of the members subjected to compression initially through said engagement and to further compression through shock on the supported member.

6. In a mounting, the combination of a supported and a supporting member, one of said members being within the other and having spaced walls; and a dampening device comprising an uncompressed rubber portion arranged between the walls normally carrying a major portion of the load through shear of the rubber and a concave rubber projection from said rubber portion, said rubber portion yielding under normal load to bring the concave surfaces into compression engagement with one of the members.

7. In a mounting, the combination of a supported and a supporting member, one of said members being within the other and having spaced walls; and a dampening device comprising an uncompressed rubber portion arranged between the walls normally carrying a major portion of the load through shear of the rubber, and a convex rubber projection from said rubber portion, said rubber portion yielding under normal load to bring the convex surfaces into compression engagement with the one member, and said rubber portion having at its opposite end a rubber projection having a depression, the surface of which is adapted to engage one of the members and resist shock between the members through compression.

8. In a mounting, the combination of a supported and a supporting member, one of said members being within the other and having spaced walls; and a dampening device comprising an uncompressed rubber portion arranged between the walls normally carrying a major portion of the load through shear of the rubber, and a convex rubber projection from said rubber portion, said rubber portion yielding under normal load to bring the convex surfaces into compression engagement with one of the members, and said rubber portion having at its opposite end a rubber projection having a depression, the surface of which is adapted to engage one of the members and resist shock between the members through compression, the depression being greater than the projection.

9. In a mounting, the combination of two members, one of the two members including a supporting wall and a rubber element in union with and projecting from the wall into free space and in shear relation to the wall between the members; and means initially compressibly engaging the rubber element restraining through such engagement the shear action of at least a portion of the rubber.

10. In a mounting, the combination of two members, one of the two members including a supporting wall and a rubber element in union with and projecting from the wall into free space and in shear relation to the wall between the members; means loading the element in shear and adapted to engage the rubber element and through such engagement to restrain the shear action of at least a portion of the rubber; and devices pre-loading the element to modify the shear action.

11. In a mounting, the combination of two members, one of the two members including a supporting wall and a rubber element in union with and projecting from the wall into free space and in shear relation to the wall between the members; means loading the element in shear and adapted to engage the rubber element and through such engagement to restrain the shear action of at least a portion of the rubber; and resiliently controlled devices for preloading the element.

12. In a mounting, the combination of two members, one of the members including a supporting wall; a rubber element having union with and projecting in shear relation to the wall into free space between the members, one face of the rubber element being inclined to the direction of shear; and means initially compressibly engaging the rubber element restraining through such engagement the shear action of at least a portion of the rubber.

13. In a mounting, the combination of two members, one of the members including a supporting wall; a rubber element having union with and projecting in shear relation to the wall into free space between the members, one face of the rubber element being inclined to the direction of shear; means adapted to engage the rubber element to restrain through such engagement the shear action of at least a portion of the rubber; and devices pre-loading the element to modify the shear action.

14. In a mounting, the combination of opposing wall portions; a member comprising rubber having union with and projecting from said wall portions into free space and in shear relation thereto, the rubber of one face of the member being convex; and means initially compressibly engaging the convex surface of the rubber restraining through such engagement the shear action of at least a portion of the rubber.

15. In a mounting, the combination of opposing wall portions; a member comprising rubber having union with and projecting from said wall portions into free space and in shear relation thereto, the rubber of one face of the member being convex; means adapted to engage the convex surface of the rubber and restrain through such engagement the shear action of at least a portion of the rubber; and devices pre-loading the member to modify the shear action.

16. In a mounting, the combination of an outer member having opposing wall portions undeformable under normal load; and a second member comprising a rubber element having union with and projecting from said wall portions, the rubber of said second member being convex at one end and concave at the opposite end.

17. In a mounting, the combination of an outer member having opposing wall portions undeformable under normal load; and a second member comprising a rubber element having union with and projecting from said wall portions, the rubber of said second member being convex at one end and concave at the opposite end and the rubber of the second member being thicker adjacent to the opposing walls than toward the center of the member.

18. In a mounting, the combination of an outer member having opposing wall portions undeformable under normal load; a second member comprising a rubber element having union with and projecting from said wall portions, the rubber of said second member being convex at one end and concave at the opposite end; and means initially compressibly engaging the convex end of the member and restraining through such engagement the shear action of at least a portion of the rubber.

19. In a mounting, the combination of an outer member having opposing wall portions undeformable under normal load; a second member comprising a rubber element having union with and projecting from said wall portions, the rubber of said second member being convex at one end and concave at the opposite end; means adapted to engage the rubber on the convex end of the member and to restrain through such engagement the shear action of at least a portion of the rubber; and devices pre-loading said second member to modify the shear action.

20. In a mounting, the combination of an outer member having opposing wall portions undeformable under normal load; a second member comprising a rubber element having union with and projecting in shear relation into free space between said wall portions, the rubber at one end being convex and the mounting at the opposite end being concave; means adapted to engage the convex surface of the rubber and to restrain through such engagement the shear action of at least a portion of the rubber; and devices preloading the element, the pre-loading pressure on the convex end being countered on the outer portions of the concave end of the mounting.

21. In a mounting, the combination of a member having opposing outer wall portions undeformable under normal load; a second member comprising rubber portions having union with and projecting in shear relation into free space between said wall portions, the rubber at one end being convex and the mounting at the opposite end being concave; means adapted to engage the convex surface of the rubber and to restrain through such engagement the shear action of at least a portion of the rubber; and resiliently controlled devices for preloading, the pre-loading pressure on the convex end being countered on the outer portions of the concave end of the mounting.

22. In a mounting, the combination of a supported and a supporting member having opposingly spaced wall portions; and a dampening member comprising rubber portions between the walls carrying a major portion of the load of the supported member on the supporting member through shear of the rubber, and a rubber portion having initial engagement with one of the members restraining the shear action of at least a portion of the rubber.

23. In a mounting, the combination of a supported and a supporting member having opposingly spaced walls; a dampening member comprising a rubber portion between the wall portions carrying a major portion of the load of the supported member on the supporting member through shear of the rubber, and an inclined rubber portion adapted to engage with one of the members and to restrain through such engagement the shear action of at least a portion of the rubber; and devices pre-loading the mounting to force the engagement of the inclined rubber portion to modify the shear action.

24. In a mounting, the combination of two members, one of the two members including a supporting wall and a rubber element in union with and projecting from the wall into free space and in shear relation to the wall between the members, one end of the rubber being inclined toward the wall, said rubber element yielding under load to bring the inclined surface into compression engagement with one of the members.

25. In a mounting, the combination of two members, one of the two members including a supporting wall and a rubber element in union with and projecting from the wall into free space and in shear relation to the wall between the members, one end of the rubber being inclined away from the wall and the other end of the rubber being inclined toward the wall; and means compressibly engaging the ends of the rubber element restraining through such engagement the shear action of at least a portion of the rubber.

26. In a mounting, the combination of opposing wall portions; a member comprising rubber having union with and projecting from said wall portions into free space and in shear relation thereto, the rubber of one face of the member being concave; and means compressibly engaging the concave surface of the rubber restraining through such engagement the shear action of at least a portion of the rubber.

IRVING P. WHITEHOUSE.